(12) United States Patent
Steinich

(10) Patent No.: US 7,863,519 B2
(45) Date of Patent: Jan. 4, 2011

(54) WATERTIGHT SENSOR

(75) Inventor: Klaus Manfred Steinich, Zorneding (DE)

(73) Assignee: ASM Automation Sensorik Messtechnik GmbH, Moosinning (DE)

( * ) Notice: Subject to any disclaimer, the term of this patent is extended or adjusted under 35 U.S.C. 154(b) by 856 days.

(21) Appl. No.: 11/807,416

(22) Filed: May 29, 2007

(65) Prior Publication Data
US 2008/0196919 A1   Aug. 21, 2008

(30) Foreign Application Priority Data
May 29, 2006  (DE) ................. 10 2006 024 967

(51) Int. Cl.
*H05K 5/00* (2006.01)
(52) U.S. Cl. ............ 174/50; 174/520; 174/50.5; 174/50.52; 174/539; 73/753; 73/431; 374/135
(58) Field of Classification Search ............ 174/50, 174/520, 50.5, 50.51, 50.52, 50.53, 50.54, 174/50.61, 521, 522, 535, 539, 564, 650, 174/656, 152 G, 153 G, 152 R, 135, 17 R; 73/431, 730, 706, 756, 700, 753; 439/535, 439/536, 877, 275, 559; 374/135
See application file for complete search history.

(56) References Cited

U.S. PATENT DOCUMENTS

| | | | | |
|---|---|---|---|---|
| 2,605,315 | A * | 7/1952 | Hargett | ................ 439/275 |
| 4,599,487 | A | 7/1986 | Blank et al. | |
| 5,046,857 | A * | 9/1991 | Metzger et al. | ............. 374/135 |
| 5,302,138 | A * | 4/1994 | Shields | ................ 439/559 |
| 5,362,258 | A | 11/1994 | Arnswald et al. | |
| 5,749,656 | A * | 5/1998 | Boehm et al. | ............... 439/877 |
| 6,433,275 | B1 * | 8/2002 | Rittmann et al. | ............. 174/50 |
| 6,612,168 | B2 * | 9/2003 | Barr et al. | ................ 174/521 |

FOREIGN PATENT DOCUMENTS

| | | |
|---|---|---|
| DE | 1 490 393 | 4/1963 |
| DE | 34 12 786 A1 | 4/1984 |
| DE | 42 30 138 A1 | 9/1992 |
| DE | 195 30 422 A1 | 8/1995 |
| DE | 297 05 551 U1 | 3/1997 |
| EP | 1 032 082 A2 | 8/2000 |

* cited by examiner

*Primary Examiner*—Angel R Estrada
(74) *Attorney, Agent, or Firm*—Head, Johnson & Kachigian, P.C.

(57) ABSTRACT

The invention relates to electrical sensors, which are tight against longitudinal water, and to a process for a simple and cost efficient manufacture, with a tightly closed housing, a sensor element, at least one cable leading out of the housing, wherein the electrical conductors of the cable in the housing comprise a massive cross section without a cavity at least in one longitudinal section, a conductor seal seals the massive cross section against the lead insulation, a lead seal seals the lead insulation against the jacket of the cable, and against all other jackets, and a jacket seal seals the cable jacket against the housing.

30 Claims, 1 Drawing Sheet

WATERTIGHT SENSOR

CROSS-REFERENCES TO RELATED APPLICATIONS

This application claims priority from German Patent Application No. 10 2006 024 967.4-55 filed 29 May 2006.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION (1) Field of the Invention

The invention relates to electrical sensors.

All electrically operating sensors, independently of what is being measured by them, react to moisture present in the sensor element and/or in the processing electronic, thus generally in the sensor housing, due to the electrical conductivity of the water and its corrosion effects which causes erroneous measurements or total failure. Therefore, sealing against moisture is one of the most important prerequisite for the long-term functionality of an electrical sensor, as with any electrical device.

This applies even more, the more sensitive or the lower the resistance of the electrical part of the sensor is, possibly also to the sensitive, non-electrical part of the sensor element.

Since measurement signals have to be transmitted from the sensor to the outside, an electric cable for data transfer leads out of almost every sensor housing. A wireless data transmission from a hermetically sealed housing is a comparatively expensive and complicated solution.

Normally, it is not a big problem to seal the housing itself and to create a sufficient seal with a long term effect between an outer circumference of a cable jacket and an interior circumference of the cable input at the housing, e.g. via typically packing sleeves and a screwed grommet.

If the sensor is used in a humid environment, a substantially long-term risk for the sensor is that longitudinal water enters into the sensor housing through the cable itself. This may occur through gaps between the single lead insulations and the cable jacket or also through gaps within the lead insulation, thus between particular strands of an electrical conductor made from a plurality of strands shaped as a lead of the cable.

Even when the outer end of the cable is not located in a fluid but only in humid air, a pump effect can occur through temperature variations (day-night change) and ensuing pressure differentials within the cable. The pump effect can transport mid term and long term damaging amounts of moisture, also in the form of gas from the surrounding air, into the housing of the sensor.

BRIEF SUMMARY OF THE INVENTION

It is the object of the present invention to provide an electric sensor which is sealed against longitudinal water and to provide a process for simple and cost efficient manufacture of the sensor.

Through combining various sealing measures, water is prevented from penetrating into the sensor element, thus into the interior of the housing.

Through redesigning the electrical conductors of the cable, at least in a certain longitudinal section, into a massive, cavity free cross section, e.g. through soldering of the previously singular strands of the conductor into a massive cross section, water is prevented from penetrating in longitudinal direction between the single strands of the cable. In case the electrical conductor is already made from a massive material, a respective redesign is not necessary. Through sealing this massive cross section of the conductor radially against the surrounding lead insulation, no water can penetrate between the conductor and lead insulation.

Through sealing the lead insulation relative to the jacket of the cable and relative to the other leads, or a core material between the leads, the penetration of water in the area between the single strands and within the cable jacket is avoided.

Through sealing between cable jacket and the interior circumference of the housing, the penetration of water between the cable circumference and the housing is avoided.

A particularly simple solution to design this seal includes encasing a longitudinal section having all of the cavity free cross-sections within an encasement material. The encasement material works like a gasket and preferably is made from a hardening encasement material.

Instead of only encasing the respective longitudinal section where the bared, massive conductor cross sections are located, the entire interior of the housing can be also encased, thus including the sensor element, in case this is not damaging to the sensor element for other reasons, e.g. due to the reaction heat generated during the hardening of the encasement material.

In case the electrical conductors of the cable or cables are being run to the sensor element, the longitudinal area in which the conductors are reconfigured into a massive cross section without a cavity can be located at any location within the sensor housing. Under certain conditions, it can also be the connection location towards the sensor element, wherein the sensor element then almost inevitably has to be encased integrally.

If this is not desired, the leads of the cable would have to be stripped off the cable jacket in this case, and also of the lead insulation over a certain length at a location sufficiently far in the rear of the interior of the sensor housing so that the encasement material can penetrate to the electrical conductors.

Since this is difficult to do manually on an uncut cable, and in addition, at the employed sensor elements or electronic components of the processing circuit in the sensor housing rather very thin electrical conductors are being used as primary conductors, then primary conductors through thicker leads run in via a cable, the location of the solder joint between primary and secondary conductors is being used as an area, in which also the strands themselves are already compacted into a massive cross section due to the soldering of the strands amongst each other.

For the electrical function of the sensor, it is important that the areas with a massive cross section, which were stripped of their insulation for the compacting process, do not have any lateral contacts and short circuits between the particular conductors.

This can be realized in a different manner.

A very simple solution is surrounding each of these electrical conductors with a spacer sleeve which, on the one hand, is made from electrically non-conductive material and, on the other hand, allows penetration of encasement material through the sleeve to the electrical conductor and its complete encasement. For this purpose, the spacer sleeve is preferably made from a woven mesh material or woven grid material, e.g. from plastic.

Another possibility is to position the particular conductors sufficiently next to each other, e.g. through arranging them in the cutouts of a laterally extending plate as spacer, and to do this close enough to the longitudinal areas where the insulation is stripped which shall be encased, so that no lateral contact can occur any more in this location.

The spacer has to be configured and positioned so that it does not inhibit the complete enclosure of the electrical conductors with stripped insulation in the area with a massive cross section through encasement material.

If the sensor housing has a large opening which can eventually be sealed tight with a lid, the filling of the encasement material can certainly be performed via this lid opening, at least when the lid opening is in the suitable position, thus opposite to the encasement area.

If the housing does not have a detachable cover but is only comprised of e.g. of two half shells which are interlocked relative to each other once and also glued together through the encasement material, this is not possible anymore, since the two shells have to be fixed against each other before the encasement.

A bubble free encasement is accomplished through the sensor housing which is ready for the encasement and filled with the respective components. The sensor housing does not only have an encasement opening for filling in the encasement material but also has a second bleed opening from which the air to be displaced can be pressed out of the interior of the sensor housing by the penetrating encasement material.

Therefore, the bleed opening should be higher during the encasement and the hardening than the fill in opening or at least high enough so that in the area above no electrical components are present anymore.

The sealing between the outer circumference of the cable, thus the outer circumference of the jacket, and the inner circumference of the cable input in the housing is preferably performed through a conventional cable end closure. In the cable end closure, an annular packing sleeve with a preferably conical cross section is inserted into the distance between the outer circumference of the cable and the inner circumference of the cable in feed and pressed forward in longitudinal direction through a cup-shaped, inserted and screwed down threaded grommet. The cable and closure simultaneously serves to avoid the running out of the encasement material during encasement.

The encasement can also be performed in steps after the hardening of the respective preceding step, in particular, when the heat development in the sensor shall be limited in the particular steps.

Since the encasement material normally shrinks during the hardening process, the volume in the bleed opening can be used as buffer volume for the shrinking of the encasement material, so that when initially filling up to the outer edge of the bleed opening, it is assured that after the hardening process the encasement material does not recede further than to the bottom edge of the bleed opening.

DETAILED DESCRIPTION OF THE INVENTION

Figure 1:
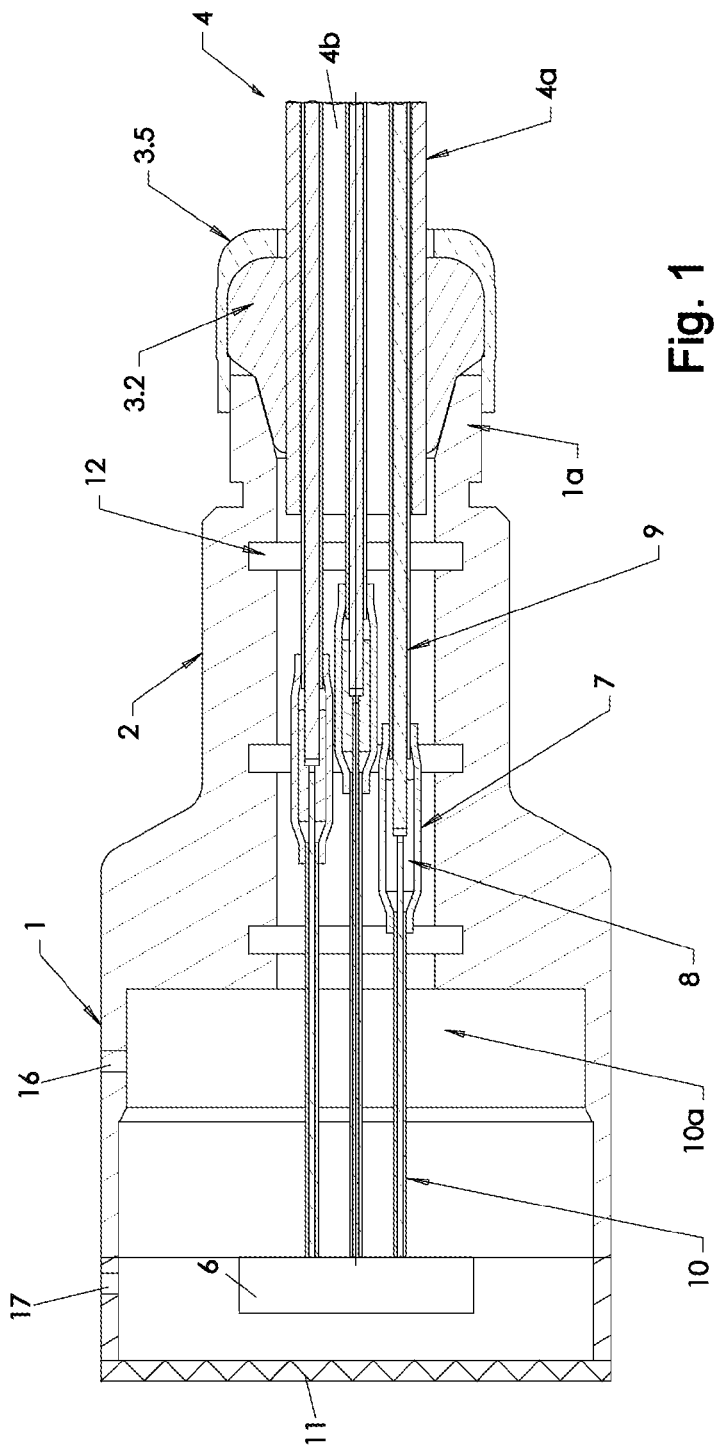
FIG. 1 is a longitudinal section through a sensor completed for encasement which is tight against longitudinal water.

FIG. 1 shows a rotationally symmetrical sleeve-shaped sensor housing 1 and an almost rotationally symmetrical sleeve packing 3.2 having a conically tapered front end that seals an outer circumference of a cable 4 relative to an interior circumference of a cable input 1a of the housing through axial impression. The axial impression is performed through a commercially available pot-shaped threaded grommet 3.5.

As can be seen, cable 4 is comprised of several strands that constitute primary conductors 9 and which are each provided with a particular lead insulation 9a which are, in turn, received within a cable jacket 4a spaced from each other by a cable core 4b.

In FIG. 1, at the upper left end of the sensor housing, a sensor element 6 is located, e.g. an electronic chip or an electrical circuit, on which the sensor element is located and from which the secondary conductors 10 lead away, one of which is respectively connected with one of the strands of cable 4 as a primary conductor 9.

In order to reliably prevent a penetration of longitudinal water through the cable into the interior, thus, into the interior space in sensor housing 1, a sealing has to be performed at each particular lead, on the one hand, of the particular strands of the electrical conductor amongst each other and, on the other hand, of the strands relative to lead insulations 10a, 9a. Furthermore, a sealing has to be performed of each particular lead relative to jacket 4a of cable 4 and all other leads of cable 4, e.g. through an encasement with a sealing means, in particular, a hardening sealing means.

This sealing is provided when the entire cross section is sealed between an interior circumference of housing 1 and an outer circumference of all electrical conductors 9, 10 and spaces between the conductors 9 and 10.

The sealing of the spaces between the strands of the conductors, in case these conductors are of the primary conductors, thus the particular leads, that do not already have a massive cross section, is performed through the penetration of liquid soldering tin, while all other seals are formed by encasement material.

For this purpose, sensor housing 1 can have cable input 1a having an interior cross section only marginally larger than an outer circumference of the cable and long enough in axial direction to receive all longitudinal sections of the electrical conductors each having a cross section converted into a massive cross section.

The manufacture of the sensor is then performed in the following steps:

stripping the insulation of the free ends of the secondary leads 10 pointing away from sensor element 6 at a defined distance from sensor element 6 and over a defined length;

removing cable jacket 4a from cable 4 over a certain length;

freeing the particular leads as primary leads/conductors 9 from the cable core;

shortening the leads to certain lengths, depending on the end of the cable insulation 4a or depending on the end of other leads;

removing lead insulation 9a, 10a over a certain length from particular leads;

sliding a spacer sleeve 7 onto the end of each primary conductor 9 or associated secondary conductor 10;

tinning the ends of secondary and primary conductors 10, 9, possibly using soldering sleeves;

soldering one respective primary lead 9 with a secondary lead 10;

subsequently sliding spacer sleeve 7 over the soldered section with a massive cross section;

inserting sensor element 6 into an interior cavity 15 of sensor housing 1 so that the cable sleeve 4a still reaches into cable input 1a; and sliding the packing sleeve 3.2 into the space between cable jacket 4a and the beginning of cable input 1a, axial sliding and screwing tight threaded grommet 3.1 onto the outer circumference of cable input 1a.

After positioning of the sections with the massive conductor cross section is performed in the interior of the sensor housing in this manner, and the intermediary state according to FIG. 1 is reached, the interior space 15 is now filled with encasement material, at least in the area of the massive cross section.

This is preferably performed from a cover opening, that is with a cover 11 not yet in place. The encasement material is filled through the cover opening, preferably past sensor element 6, with the sensor housing 1 standing approximately vertical, up to the desired encasement height, thus at least beyond the connection locations between primary conductors and secondary conductors, possibly until also sensor 6 is integrally enclosed.

In this case, a designated encasement opening 16 and a bleed opening 17 are not necessary, and they are only being used if the housing is substantially closed during encasement. Thus, no removable cover 11 is present, but this is a closed housing side.

Preferably, the sensor housing is then positioned so that the bleed opening, which is also present in the housing, is located higher than encasement opening 16, and beyond that interior space 15 to be encased, is laid out so that during encasement, with the liquid level of the encasement material rising, no cavities remain, which are not filled by the encasement material, and which are not vented, in which in particular electric components are located.

In this manner, either only the area of cable input 1a or the entire interior space 15, including the sensor element 6, can be encased if the encasement is not mechanically detrimental for the sensor element 6 or detrimental due to the heat development during the hardening process of the encasement material.

According to FIG. 1, cable input 1a comprises a hollow cylindrical interior, in whose longitudinal extension all section of the conductors converted into a massive cross section are positioned, and in whose interior circumference several annular circumferential or punctual anchor chambers 12 leading radially to the outside are provided, into which the encasement material also penetrates, and anchors in longitudinal direction 8 of the cable direction of extension, after hardening, through which a pull relief for the cable is provided.

If only the cable input 1a is to be encased, this is performed through slanted or vertical alignment of the longitudinal cable axis with the sensor housing 1, with the cable end closure 3 facing downward, while with complete encasement also the horizontal position during encasement and hardening can be maintained.

The spacer sleeves 7, thereby, are made from electrically non-conductive material, and reach from the area with the insulation stripped and reconfigured into a massive cross-section via soldering tin, up to the two abutting lead insulations 9a, 10a of the primary conductor 9 and the secondary conductor 10.

Preferably, each spacer sleeve 7 is thus comprised of a woven mesh, which can be permeated by the encasement material without any problems, so that it can penetrate completely up to the cross section of the conductor.

In case the spacer sleeve 7 does not have this property to be permeable by the encasement material, the respective free end of the spacer sleeve 7 is sealed relative to the respective lead insulation 9a, 10a and, thereby also the penetration of longitudinal water towards the sensor element 6 is avoided.

REFERENCE NUMERALS

| | |
|---|---|
| 1 | Sensor housing |
| 1a | Cable input |
| 2 | Encasement compartment (primary) |
| 3 | Cable end closure |
| 3.1 | Threaded grommet |
| 3.2 | Packing sleeve |
| 4 | Cable |
| 4a | Cable jacket |
| 4b | Core |
| 5 | Seal means (O-ring) |
| 6 | Sensor element |
| 7 | Spacer sleeve |
| 8 | Longitudinal direction |
| 9 | Primary conductor |
| 9a | Lead insulation |
| 10 | Secondary conductor |
| 10a | Lead insulation |
| 11 | Cover |
| 12 | Anchor chamber |
| 13 | |
| 14 | Threaded connector |
| 15 | Interior cavity |
| 16 | Encasement cavity |
| 17 | Bleed opening |

What is claimed is:

1. An electrical sensor being sealed against longitudinal water, said sensor comprising:

a sensor element (6);

at least one cable (4) leading out of a tightly sealed housing (1) having an interior, the housing further including, electrical conductors of the at least one cable (4) having a massive cross section without a cavity, at least in one longitudinal section, a conductor seal sealing the massive cross section against a lead seal (9a), the lead seal sealing a lead insulation (9a) against a jacket (4a) of the at least one cable (4) and relative to all other leads, and a jacket seal sealing the cable jacket (4a) against the housing (1);

wherein at least one spacing device spaces the massive conductor cross sections being, stripped of their lead insulation apart from each other;

wherein said at least one spacer device is formed by a spacer sleeve (7) which can be permeated by the encasement material, the spacer sleeve being a woven mesh sleeve.

2. The sensor according to claim 1 wherein each said seal is made from a hardening encasement material.

3. The sensor according to claim 1 wherein said electrical conductors (9, 10) are stripped of lead insulation in the area of said massive cross section without cavities.

4. The sensor according to claim 1 wherein the area of the massive cross section of said electrical conductors (9, 10) without cavities is formed by a solder joint between a thin secondary lead (10) used within the sensor, and a lead of said at least one cable (4) leading into said housing (1) as a primary conductor.

5. The sensor according to claim 1 wherein said spacing device is provided through inserting the leads provided with lead insulation, offset in longitudinal direction relative to the massive cross section, into a mechanical spacer being a cross plate with cutouts for the particular leads.

6. The sensor according to claim 5 wherein said cross plate serves as a boundary for an encasement area.

7. The sensor according to claim 1 wherein said at least one spacing device is provided through a lateral offset of the sections with a massive cross section without cavity and a parallel guide of the particular leads.

8. The sensor according to claim 7 wherein said parallel guide is formed through mechanical spacer devices or cross plates with cutouts for particular leads, and the cross plate is provided as boundary for the encasement area in longitudinal direction.

9. The sensor according to claim 1 wherein said jacket seal is a packing sleeve with a conical cross section.

10. The sensor according to claim 1 wherein said housing has an encasement opening (16) and a bleed opening (17) located at a higher point than the encasement opening (16) during the encasement and hardening phase.

11. The sensor according to claim 1 wherein said encasement material simultaneously serves as pull relief for said cable through undercuts in said interior circumference of said housing serving as anchor chambers (12) in longitudinal direction.

12. A process for manufacturing an electrical sensor that is tight against longitudinal waters, the sensor having a tightly sealed sensor housing (1), a sensor element (6) in the interior of the sensor housing (1), primary conductors, which lead away from the sensor element (6), a cable (4) which leads out of the housing (1), and spacer sleeves (7) in form of woven mesh sleeves, permeated by an encasement material, said processing for manufacturing the sensor comprising the following steps:
 stripping the insulation of opposing ends of the primary conductors (9) and of leads (10) of the cable as secondary conductors, tinning over their entire cross section and soldering together;
 sliding a spacer sleeve (7), which has been previously slid onto the primary conductors or the secondary conductor (10) respectively, over the solder joint;
 encasing the free space between the interior cross section of the housing and, the massive cross sections of the conductors (9, 10) without cavities, completely with encasement material, at least over the longitudinal area, in which all spacer sleeves (7) are located, the encasement material penetrating up to the massive cross section of the conductors (9, 10) due to the penetrability of the spacer sleeves (7).

13. A process according to claim 12 wherein a packing sleeve (3.2) is inserted into a cable outlet (1a) enclosing a cable jacket (4a) and pressed against the housing (1) by a threaded grommet (3.1).

14. A process according to claim 12 wherein particular leads are inserted on the outside of the cable jacket (4a) into cutouts of a cross plate as a spacer.

15. A process according to claim 12 wherein the housing (1) is positioned during the encasement and hardening so that a bleed opening (17) is located higher than an encasement opening (16), and the encasement process continues until encasement material can be seen in the lead opening or exits from the bleed opening (17).

16. A process according to claim 15 wherein the volume of the bleed opening (17) is sized large enough to serve as a buffer volume for the shrinkage of the encasement material during the hardening process.

17. A process according to claim 12 wherein an interior (15) of the sensor housing (1) is being completely encased, in steps after hardening of the respective preceding steps.

18. A process according to claim 12 wherein penetration of the soldering tin between the strands of the leads is accomplished through the rise of the liquid soldering tin against gravity.

19. A process according to claim 12 wherein before soldering, at least the secondary conductors (10) are inserted into respective soldering sleeves and soldered therein.

20. An electrical sensor which is tight against longitudinal water, said sensor comprising:
 a tightly sealed housing (1);
 a sensor element (6);
 at least one cable (4) lead out of the housing (1); and
 in the interior of the housing electrical conductors of the at least one cable (4) have a massive cross section without a cavity at least in one longitudinal section, and an entire interior cross section between the housing and the massive conductors is filled with encasement material without any cavity in a longitudinal area, in which all massive cross sections of all conductors are included;
 wherein at least one spacing device spaces the massive conductor cross sections being stripped of their lead insulation apart from each other;
 wherein said spacing device is formed by a spacer sleeve (7) which can be permeated by the encasement material, in particular, of a woven mesh sleeve.

21. The sensor according to claim 20 wherein an entire interior cavity (15) of said housing (1) is encased with hardened encasement material.

22. The sensor according to claim 20 wherein said electrical conductors (9, 10) are stripped of lead insulation in an area of said massive cross section without cavities.

23. The sensor according to claim 20 wherein the area of the massive cross section of the electrical conductors (9, 10) without cavities is formed by a solder joint between a thin secondary lead (10) used within the sensor, and a lead of said at least one cable (4) leading into said housing (1) as a primary conductor.

24. The sensor according to claim 20 wherein said spacing device is provided through inserting the leads provided with lead insulation, offset in longitudinal direction relative to the massive cross section, into a mechanical spacer being a cross plate with cutouts for the particular leads.

25. The sensor according to claim 24 wherein said cross plate serves as a boundary for the encasement area.

26. The sensor according to claim 20 wherein said spacing device is provided through a lateral offset of the sections with a massive cross section without cavity and a parallel guide of the particular leads.

27. The sensor according to claim 26 wherein said parallel guide is formed through mechanical spacer devices or cross plates with cutouts for particular leads, and the cross plate is particular provided as boundary for the encasement area in longitudinal direction.

28. The sensor according to claim 20 wherein a jacket seal is a packing sleeve with a conical cross section.

29. The sensor according to claim 20 wherein said housing has an encasement opening (16) and a bleed opening (17) located at a higher point than the encasement opening (16) during the encasement and hardening phase.

30. The sensor according to claim 20 wherein said encasement material simultaneously serves as pull relief for said cable through the undercuts in the interior circumference of said housing serving as anchor chambers (12) in longitudinal direction.

* * * * *